US006453925B1

(12) United States Patent
Kamo

(10) Patent No.: US 6,453,925 B1
(45) Date of Patent: Sep. 24, 2002

(54) SOLUTION FEEDING APPARATUS AND SOLUTION FEEDING METHOD

(75) Inventor: Hisao Kamo, Matsudo (JP)

(73) Assignee: Chugai Photo Chemical Co., LTD (JP)

( * ) Notice: Subject to any disclaimer, the term of this patent is extended or adjusted under 35 U.S.C. 154(b) by 0 days.

(21) Appl. No.: 09/664,159

(22) Filed: Sep. 18, 2000

(30) Foreign Application Priority Data

Sep. 17, 1999 (JP) .......................................... 11-262944
Aug. 25, 2000 (JP) ...................................... 2000-256027
Sep. 14, 2000 (JP) ...................................... 2000-279528

(51) Int. Cl.[7] ................................................ B01D 19/00
(52) U.S. Cl. ............................ 137/2; 137/173; 137/197
(58) Field of Search ............................ 137/2, 173, 197

(56) References Cited

U.S. PATENT DOCUMENTS 5,568,220 A * 10/1996 Joos et al. .................. 396/626
6,021,921 A * 2/2000 Lan et al. ................... 137/205
6,176,252 B1 * 1/2001 Peng .......................... 137/209

* cited by examiner

*Primary Examiner*—Gerald A. Michalsky
(74) *Attorney, Agent, or Firm*—Scott M. Oldham; Hahn Loeser & Parks

(57) ABSTRACT

The invention is directed to a solution feeding apparatus and a solution feeding method that are capable of feeding solution from a container until the container is completely empty while maintaining a precise feeding rate to the end of the feeding process. The solution feeding apparatus may include a solution-feeding pump connected via a tube to a container which hermetically contains a solution and is capable of changing its shape in accordance with the amount of its content is provided with a gas-liquid separation tank and a gas detection sensor. The gas-liquid separation tank serves to separate gas from solution and may be disposed in the portion of the apparatus between the container and the pump. The gas detection sensor may be disposed in the gas-liquid separation tank and serves to detect gas that has entered the solution channel. An air pump is operated in sync with the gas detection sensor so as to discharge gas out of the gas-liquid separation tank, thereby constantly maintaining gas in the solution channel at a given quantity. The apparatus is also provide with a solutions depletion sensor adapted to detect reduction of the pressure in the solution channel, which pressure reduction results from depletion of the solution in the container.

13 Claims, 14 Drawing Sheets

SOLUTION FEEDING APPARATUS AND SOLUTION FEEDING METHOD

FIELD OF THE INVENTION

The present invention relates to a solution feeding apparatus. More particularly, the invention relates to an apparatus that may be used, for example, as a replenishing apparatus to replenish a processing solution for processing a silver halide photographic material using an automatic developing apparatus.

BACKGROUND OF THE INVENTION

Typical examples of methods of processing a silver halide photographic material after exposure of the photographic material to a light image include those which are employed for processing a monochrome photograph and comprised of such processes as developing, fixing, water washing and drying; those employed for processing a color negative film and comprised of such processes as color developing, bleaching, fixing, water washing, stabilizing and drying; and those employed for processing a color paper and comprised of such processes as color developing, bleaching fixing, water washing, stabilizing and drying. These processes are usually conducted with an automatic developing apparatus by using respective processing solutions. As use of an automatic developing apparatus is becoming more commonplace, using a rinse or other substitute solution in lieu of water washing is on the increase. Compositions of these developing solutions and fixing solutions change as a result of processing a silver halide photographic material. In addition, the elapse of time, developing solutions and fixing solutions suffer from decrease in their effectiveness due to air oxidation. In order to prevent these problems and maintain the processing solutions sufficiently effective during continuous processing using an automatic developing apparatus, it is common practice to replenish each respective processing solution with a replenishment solution having a composition either the same as or similar to that of the processing solution.

Each solution for processing a silver halide photographic material is usually supplied in the form of a condensed liquid and requires dilution with water to a given concentration before actually used. In this case, the dilution has to be done precisely; a silver halide photographic material processed with an inaccurately dilutes processing solution may result in a finished photograph having a considerably poor quality.

Some kind of solution, such as a color developing solution or a bleaching fixing solution, is supplied in a plurality of solution parts in order to increase the preservability not desirable to contact therewith. When actually used, such a solution has to be prepared by mixing the concentrated stock solutions, each of which usually consists of two to four solution parts, such as mistaking a solution part for that of another processing solution, often happen. It is not uncommon that such a mistake seriously and irreparably impairs the quality of the finished photograph.

As described above, preparation of processing solutions imposes a heavy burden on the operator, because it is not only complicated but also requires precision. Furthermore, it often happens that a condensed solution or a prepared solution spill or spatter onto nearby objects, such as a human body, clothes or furniture and equipment, sometimes contaminating or otherwise damaging the objects. In order to prevent these problems, it has been practiced to supply each processing solution in the form of a ready-to-use solution, with the conditions of the solution adjusted beforehand. Nevertheless, supplying a solution in the form of a concentrated stock solution still has advantages in that is occupies less space for distribution or storage and that it has superior stability in preservation.

When solutions that have been prepared as above are used as replenishment solutions, they are usually stored in separate, respective replenisher tanks, from which a necessary quantity of each respective replenishment solution for the current stage of processing a silver halide photographic material is fed into a solution tank in the automatic developing apparatus with a pump or by other appropriate means. At that time, as the replenishment solutions in the replenisher tanks are stored in such a state as to be exposed to the air, they present the possibility of becoming concentrate due to evaporation of moisture as well as quality deterioration resulting from air oxidation. Should a processing solution be replenished with a replenishment solution that has thus become deteriorated or changed in quality, effectiveness of the processing solution decreases, resulting in poor image quality of the finished photograph.

Examples of means to prevent such a deterioration include a method that calls for disposing a floating lid or a floating ball in a replenisher tank to cover the surface of replenishment solution and thus reduce the area of the surface of the replenishment solution in contact with the air. However such a method has not yet succeeded in completely isolating a solution from air. In view of preservation of the environment and natural resources, the quantity of replenishment solution used for processing a silver halide photographic material is on the decrease in recent years. Therefore, if a replenishment solution is prepared in the same amount as before, it is stored in a replenisher tank for a longer period of time until it is used up and more likely to change in quality. Furthermore, reduction in the amount replenished present a problem in that even a minimal change in quality of a replenishment solution would make it difficult to maintain the constant effectiveness of the processing solution in an automatic developing apparatus and influence the quality of the finished photographs.

In order to prevent these problems, it is often practiced in recent years to feed a given quantity of water from a diluent water storage tank into a processing solution tank in an automatic developing apparatus simultaneously with drawing a formulated concentrate of processing solution out of its container and directly feeding it into the processing solution tank. Such a method has a benefit in that it eliminates the necessity of preparation of replenishment solutions. In many cases, the above method calls for a flow sensor installed in a container and acting as a solution depletion sensor to detect the solution in the container has been used. Accordingly, such a method typically calls for using a stock solution container made of a polyethylene bottle or other hard-type bottle that will be free from the problem of becoming deformed when the content is reduced. When such a bottle is used, the quantity of air inside the container increases with the decrease of the stock solution in the container. Therefore, the method is not capable of solving the problem of the concentrated stock solution deteriorating due to contact with the air. The method presents another problem in that it is difficult to form a structure where the solution depletion sensor is prevented from registering detection by mistake when there still remains the solution in the container. In other words, it is difficult to use up the solution in the container and often contaminate a human body, clothes or other objects in the environment at the time of disposal of the used container.

In order to solve the above problems, the applicant of the present invention had previously offered solution feeding methods and apparatuses used for said methods, which are disclosed in Japanese Patent Public Disclosure Nos. 52553-1999 and 102056-1999. The problem of a stock solutions deteriorating due to exposure to air can be solved by any one of the above inventions by using a container made of a deformable material as a container to be filled with a concentrated stock solution and inserting a tube or other appropriate member into the stick solution container so as to suction the solution out of the container while maintaining the container airtight. Although the container is flexible, each one of the above inventions is capable of precisely detecting that the solution in the container has been used up.

The inventions mentioned above are highly effective in the ability of preserving the stability of solutions and being convenient to prepare solutions. Each one of the above inventions is the optimal system to be used in normal, small-to-medium-sized developing laboratory. However, when used in a large-scale laboratory where processing solutions are consumed in great quantities, there is a demand for modification in certain points, which are described hereunder. As each one of the above inventions is prone to malfunction in case a great quantity of air enters a solution channel, it is necessary to reduce to an absolute minimum the quantity of air that may possibly enter a solution channel. Therefore, the most desirable method of connecting a solution container to an apparatus has heretofore been what is commonly called a penetration method that calls for sticking a tube directly into a container to connect the container to the apparatus and drawing the solution up out of the container. When a penetration method such as above is employed, it is easy to limit the quantity of air that might enter the container to a minimum. On the other hand, it is necessary to use a container suitable for a penetration method, i.e., a container made of such a material as to prevent the solution in the container from leaking from the position where a tube is stuck into the container. As a problem concerning the strength of such a material makes it impossible to produce containers having a large capacity and, at the same time, suitable for a penetration method, employing a penetration method necessitate the use of a relatively small container. This imposes a considerable burden particularly upon operators working at major developing laboratories which handle a great quantity of processing each day, each time a container solution in the container is quickly used up, and it is therefore necessary to replace containers many times a day.

For the reason describe above, it is a common practice at a major developing laboratory or the like to connect a large container to an apparatus by a method other than a penetration method. However, other methods, too, present various problems. For example in case of a method that calls for connecting a container to a solution feeding apparatus by removing a cap of the container to a solution feeding apparatus by removing a cap of the container and sealing the container with a plug that is connected to a tube, it is difficult to connect the container while limiting the air entering the container to a minimal quantity, because the air can easily enter the container when the cap is removed. Furthermore, should the feeding of the solution be initiated without thoroughly removing the air from the container, a large amount of gas inevitably flows into the solution channel, often impairing accurate solution-feeding or resulting in premature activation of a sensor adapted to detect that the container is empty.

There also is a method which calls for a plurality of small containers connected to an apparatus by using a penetration method. This method, however, is prone to present a problem of occupying an excessively large space, because it requires numerous containers in order to reduce the frequency of replacing containers. Furthermore, the larger the number of containers connected to an apparatus, the greater the total quantity of gas entering the solutions channels, even if the quantity of gas entering each container is minimal. Therefore, the number of containers used in actual practice is limited.

For the reasons stated as above, there is a demand for a solution feeding apparatus that is capable of feeding solution from its container until the container is completely empty while maintaining precise feeding accuracy, said apparatus having the effect described above regardless of whether entry of a large quantity of air into a solution channel is unavoidable, which tends to happen when a container is connected to an apparatus by using a method other than a penetration method or when a plurality of small containers are connected to an apparatus.

SUMMARY OF THE INVENTION

In order to solve the above problems, a feature of the present invention lies in providing a solution feeding apparatus which calls for connecting a solution-feeding pump through a tube to a container that contains a solution and is capable of changing its shape in accordance with the amount of its content, wherein a gas increase prevention mechanism is provided in a solution channel.

According to an embodiment of the present invention, the invention relates to a solution feeding apparatus which calls for connecting a solution-feeding pump via a tube to a container that hermetically contains a solution and is capable of changing its shape in accordance with the amount of its content, wherein a gas increase prevention mechanism is provided in a solution channel. With the configuration as above, an accurate solution-feeding rate is maintained even if a great amount of gas enters the solution channel, such as intrusion of a great amount of gas being unavoidable when, for example, any method other than penetration method is employed to set the container or when a plurality of containers are connected to the apparatus. Furthermore, the invention does not impose limitations in types of containers that can be used for the inventions and permits use of a large-capacity container, which is unsuitable for a penetration method or use of a plurality of container. Therefore, the invention enables the substantial reduction of the labor required by replacing a container or containers.

According to a further embodiment of the present invention, an airtight channel between a container and the solution-feeding pump is provided with a gas-liquid separation tank adapted to separate gas from a solution, and the gas increase prevention mechanism is comprised of a gas detection sensor and an air pump, the gas detection sensor disposed in said gas-liquid separation tank, and the air pump being so adapted as to function in sync with the gas detection sensor to discharge gas out of the gas-liquid separation tank. As the invention enables the complete separation of gas from solution in the solution channel and the discharge of the gas out of the solution channel, the invention prevents the gas from entering the solution-feeding pump and is therefore capable of more reliably maintaining a precise solution-feeding rate.

As a solution-feeding stopping device may be disposed between the container and the gas-liquid separation tank, the invention is capable of preventing solution from continuously flowing from the container into the gas-liquid separation tank by siphonage even after the solution-feeding pump is halted.

As the airtight channel between a container and the solution-feeding pump is provided with a solution depletion sensor adapted to detect that the container has become empty of solution, the invention is capable of feeding solution from its container while maintaining precise feeding rate to the end of the feeding process. In addition, as it is capable of accurately detecting that the container has become empty of solution, the invention is capable of halting feeding of the solution at the appropriate moment without the possibility of gas entering the solution-feeding pump.

As a gas discharge tube connected to the air pump may be provided with one or more check valves, the invention enables the complete discharge of gas and is free from the problem of intrusion of outside air into the airtight channel. Therefore, the invention is capable of preventing malfunction of the gas detection sensor or the solution depletion sensor.

As solution depletion sensor may be disposed in the gas-liquid separation tank, the invention eliminated the possibility of malfunction of the solution depletion sensor, which might otherwise be caused by a minimal amount of gas in the airtight channel. Therefore, the invention enables the more accurate detection of depletion of a container and more reliable prevention of intrusion of gas into the solution-feeding pump.

As the gas detection sensor disposed in the gas-liquid separation tank may also be located higher than the solution depletion sensor, the invention eliminates the possibility of malfunction of the solution depletion sensor and enables the complete consumption of solution in a container.

As the invention according to an embodiment calls for controlling the solution-feeding pump based on detection of reduction of the pressure in the solution channel by the solution depletion senor, the invention enables the complete consumption of solution in a container and is capable of halting feeding of the solution at the appropriate moment without the possibility of gas entering the solution-feeding pump.

As the invention may include a tube which can be connected to a plurality of containers, it is possible to use the apparatus with a plurality of containers connected thereto. Therefore, the invention enables the substantial reduction of the labor required by replacing containers evening case the apparatus is used for feeding a great quantity of solution.

According to another embodiment of the present invention, the invention relates to a method of feeding a solution by connecting a solution-feeding pump via a tube to a container which hermetically contains a solution and is capable of changing its shape in accordance with the amount of its content, said method calling for separating gas from the solution by means of a gas-liquid separation tank that is a part of an airtight channel extending from the container to the pump; and discharging the gas out of the solution channel by means of a gas increase prevention mechanism so that the gas in said gas-liquid separation tank is maintained at a constant quantity. Therefore, complete separation of gas from the solution in the solution channel and discharge of the gas completely out of the system can be conducted so that a precise solution-feeding rate is maintained even if a great amount of gas enters the solution channel, such an intrusion of great amount of gas being unavoidable when, for example, any method other than a penetration method is employed to set the container or when a plurality of containers are connected to the apparatus. Furthermore, the invention does not impose limitations in types of containers that can be used for the inventions and permits use of a large-capacity container which is unsuitable for a penetration method or use of a plurality of container. Therefore, the invention enables the substantial reduction of the labor required by replacing a container or containers.

According to a further aspect of the present invention, connection or removal of a container and a solution feeding apparatus to or from each other can be conducted with extreme case by using a simple mechanism. The invention has another benefit in that it enables the smooth, easy replacement of numeral containers with a minimal amount of force by using leverage. These and other aspects and advantages of the invention will become apparent upon a reading of the detailed description in conjunction with the drawings.

DETAILED DESCRIPTION OF THE INVENTION

Although the present invention is offered principally as a replenishing device for replenishing an automatic developing apparatus with a photographic processing agent, it is to be understood that the invention has a wide range of usage, the invention is applicable to feeding of any solution that is prone to changes in quality when exposed to air or hazardous to health should it come into contact with a hand. Furthermore, the term "solution" mentioned in the explanation heretofore or hereunder refers to liquid in general including pure water in which nothing is dissolved.

Figure 1:
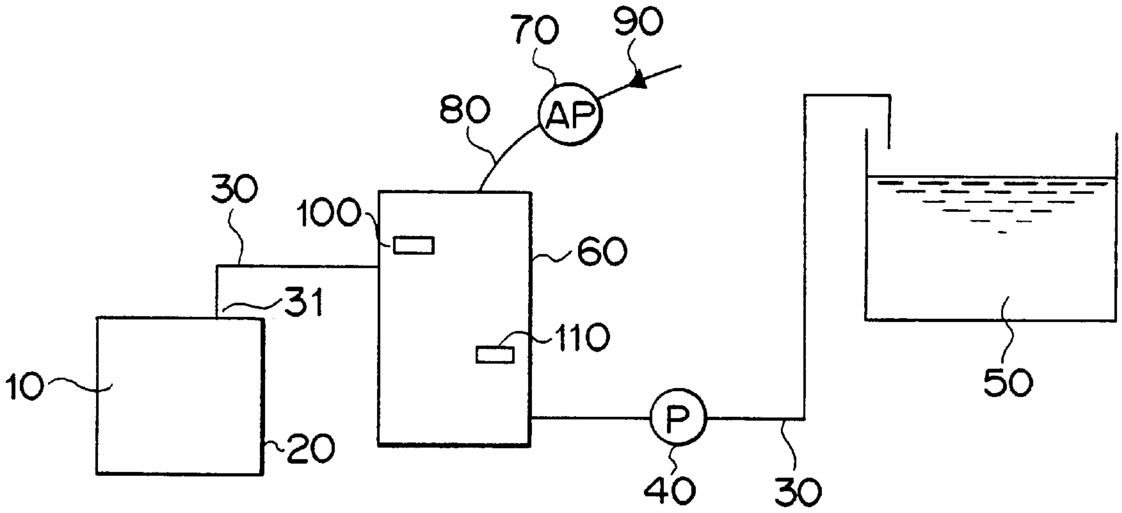
FIG. 1 is a schematic diagram showing the flow of a solution according to an embodiment of the invention.

Next, the present invention is explained in detail hereunder, referring to the attached drawings. FIG. 1 is a schematic diagram showing an embodiment of the invention.

Numeral 20 denotes a container in which a solution 10 is sealed. Numeral 30 denotes a tube, which serves to form a solution channel extending from the end portion 31 of the tube 30 through a solution-feeding pump 40 to a solution-feeding destination 50. The portion between the tube end portion 31 and the solution-feeding pump 40 in an airtight channel, which is provided with a gas-liquid separation tank 60 for separating gas that has entered the channel from the solution. An air pump 70 for discharging the gas that has been separated from the solution in the gas-liquid separation tank 60 out of the channel is connected via a gas discharge tube 80 to the upper part of the gas-liquid separation tank 60. A check valve 90 for preventing back flow of the gas is connected to the gas discharge tube 80. A gas detection sensor 100 and a solution depletion sensor 110 are installed in the gas-liquid separation tank 60. The gas detection sensor 100 is adapted to detect gas that has inadvertently enter the channel, while the solution depletion sensor 110 is adapted to detect reduction in pressure in the channel resulting from depletion of the solution 10 in the container 20 connected to the apparatus.

The solution 10 is available on the market in such a state as to be sealed in a so-called flexible type container 20, which is capable of changing its form in accordance with the quantity of its content. When the solution 10 is used, the aforementioned airtight channel isolated from the outside atmosphere and extending from the container 20 to the pump 40 is formed by air-tightly connecting the front-end portion 31 of the tube 30 to the container 20. Even if the end of the portion of the tube 30 extending further than the pump 40 is open and exposed to the outside air at the solution-feeding destination 50, it presents virtually no problems, because the portion has a small diameter so that only a minimal portion of the solution is exposed to the outside air. By operating the solution-feeding pump 40 in this state, the solution 10 in the container 20 is fed to the solution-feeding destination 50 without the possibility of the solution exposing to the outside air. When solution 10 in the container 20 is reduced with feeding of the solution 10, the container 20 becomes flattened according to the amount of its content so that the solution 10 is prevented from being exposed to air to the end of the feeding process. Therefore, even in cases where the solution 10 is a solution for processing a silver halide photographic material or other similar cases where the solution is prone to changes in quality when exposed to air, the invention is capable of feeding the solution to the end without the danger of deterioration of the solution.

Figure 2:
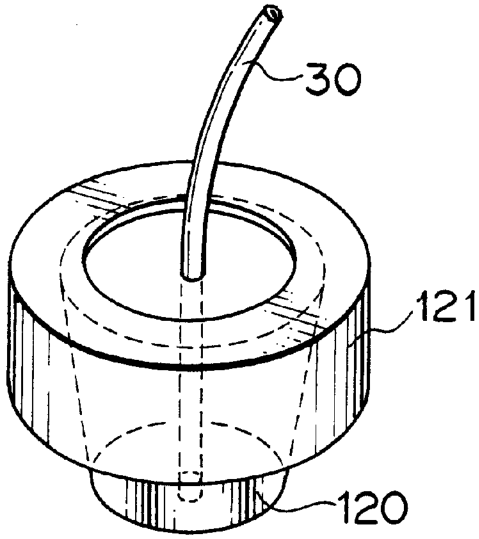
FIG. 2 is a perspective of an embodiment of an adapter used for connecting a container.
Figure 3:
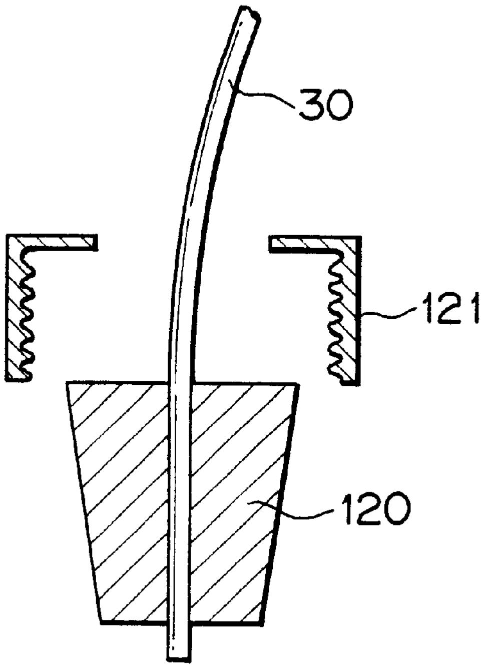
FIG. 3 is an exploded vertical sectional view of said adapter.
Figure 4:
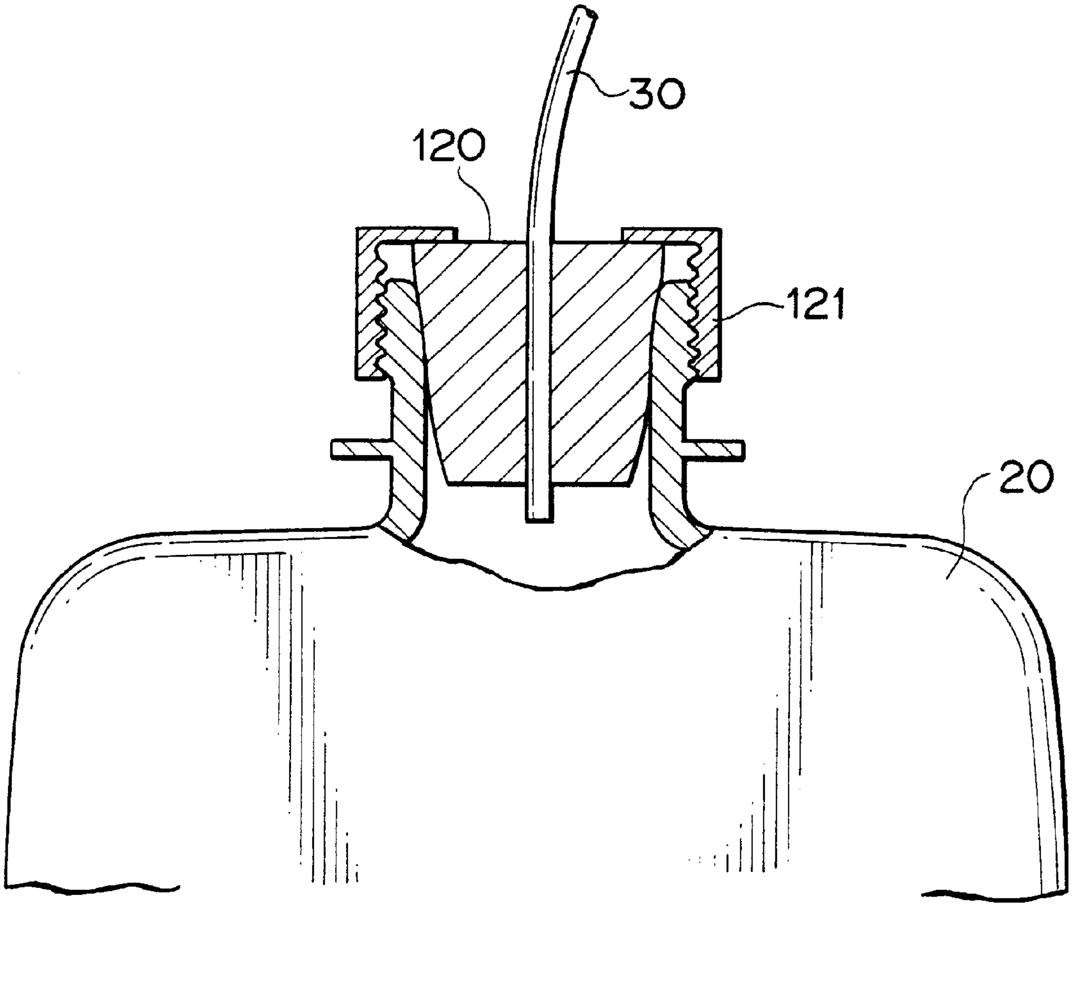
FIG. 4 is a vertical sectional view showing how said adapter and a container are connected.

The container 20 and the tube 30 are airtightly connected together so as to prevent air from entering from the connecting point to the interior of the container 20 during the period when the solution 10 is drawn out from the container 20. The term "to be airtightly connected" mentioned above refers to being connected in such a state that intrusion of the outside air is prevented; some amount of air entering a container 20 during the process of replacing the container is acceptable. As a concrete example of connecting methods, a method which calls for removing the cap from the container 20 and, in place of the cap, attaching an adapter to the container 20 is particularly convenient and desirable. Said cap is originally attached to the container 20 in the manufacturing process of the container. The adapter is required to have such a shape as to replace the cap," with an example of such shapes shown in FIGS. 2 through 4. As shown in FIG. 3, the adapter consists of a plug 120 and a perforated cap 121 that serves to hold down the plug 120. The plug 120 has such a shape as to fit in the mouth of the container 20 and has a hole to let a tube 30 be inserted therefrom. The perforated cap 121, too, has a hole as to let the tube 30 be inserted therethrough. How the adapter is used is shown in FIG. 4; the plug 120 is fit in the mouth of the container 20, and the perforated cap 121 is tightly screwed around the plug 20, thereby connecting the tube 30 to the container 20. It is impossible to completely prevent air from entering the container 20 during this process. According to the invention, however, the gas having entered the container 20 is separated in the gas-liquid separation tank 60 and discharged from the solution channel. Therefore, even if the solution-feeding pump 40 is operated without removing the gas from the container 20, the apparatus is free from the problem of reduction in the accuracy: of solution-feeding, which would otherwise be caused by gas entering the solution-feeding pump 40. Other examples of methods of: airtightly connecting the container 20 to the apparatus include a coupler method, which would enable the attachment/removal of the container with a single action. In case a container having a small capacity is used as the container 20, the tube can be connected to the container by a penetration method without causing any problems. Another example of methods of connecting a tube 30 to a container 20 is shown in FIGS. 13 through 16, wherein a spout fixing jig dedicated for this purpose is used. The aforementioned connecting method using an adapter is convenient, because it does not necessitate a special jig. However, it may increase the quantity of leftover solution, depending how the container flattened in the course of suctioning the solution 10 container 20. To be more specific, in case the container flattened in such a manner that the upper part of the side face of the container 20 is stuck to the inner surface of a spout portion 21 of the container 20, it is difficult to draw up the solution 10 located lower than said part of the side face that is stuck to the spout portion 21, often resulting in increase in the quantity of leftover solution. A container 20 made of a soft material is particularly prone to this problem.

This problem, however, can be prevented by using a spout fixing jig 180 dedicated for this purpose, because it has a structure described hereunder and is capable of controlling the manner in which the container 20 becomes flattened.

A hole 201 from which the spout portion 21 of a container 20 will protrude is bored in the top of an outer casing 200 so that the container 20 can be connected to the apparatus while it is still housed in the outer casing 200. Through the hole 201, the spout portion 21 of the container 20 alone is projected from the outer casing 200 and affixed to the fixing jig 180 with a rim 22 of the spout portion 21 hooked onto the edge of a hole of a cap receiving hole bored in the fixing jig 180. The cap receiving hole of the fixing jig 180 has a shape such that a part of the hole is larger than the spout portion 21 of the container 20 so that the spout portion 21 of the container 20 can easily be fitted in the fixing jib 180 merely by sliding the fixing jig 180.

The manner of attaching the spout portion 21 to the fixing jig 180 is explained in detail hereunder. As shown in FIG. 13 through FIG. 16, a base plate 181 is placed on the outer casing 200 while the spout portion 21 of the container 20 is inserted into an aperture 182 of the base plate 181. Then, the base plate 181 is moved forward so that the spout portion 21 moves from the aperture 182 into a through hole 183 until the rim 22 of the spout portion 21 comes into contact with the top of a through hole edge 184 and holds it down from above, As a result, the base plate 181 is secured on the outer casing 200 in the state where the base plate 181 is fastened to the container 20. The plug 120 affixed to a top plate 185 is positioned such that it will come directly above the spout portion 21. The container 20 can be plugged merely by rotating the top plate 185 downward around a fastening member 186, which is comprises of a hinge or the like, so that the plug 120 is inserted into the spout portion 21 and snugly fitted therein.

The plug 120, which has such a shape as to snugly fit in the mouth of the container 20 and through which the tube 30 is inserted, is affixed to the top plate 185 of the fixing jig 180. By fitting the plug 120 affixed to the top plate 185 into the mouth of the spout portion 21 of the container 20, the container 20 is connected the tube 30. As it is thus possible to prevent the spout portion 21 of the container 20 from becoming attached to the side face the container 20 during the period when the container 20 is flattened as a result of suctioning of the solution 10 from the container 20, the structure described above is free from the problem of increase in the quantity of leftover solution.

Further, the use of the fixing jig 180 described above is recommended also because the container 20 and the tube 30 can easily and reliably be connected to or removed from each other. As the plug 120 is affixed to the top plate 185, the plug 120 can reliably be fitted in the container 20 with a minimal amount of force by using leverage. When replacing the container 20 after it becomes empty, an unexpectedly great amount of force is required to remove the container due to the negative pressure in the empty container. Using the fixing jig 180 described above, however, enables the easy removal of the plug 120 with a minimal amount of force and therefore reduces the labor required by replacing a container.

When the solution-feeding pump 40 is actuated, the solution 10 scaled in the container 20 is suctioned from the tube and portion 31 into the gas-liquid separation tank 60. In the gas-liquid separation tank 60, the gas 11 that has entered the solution channel is separated from the solution 10 and, due to the buoyancy of the gas 11 itself, retained in the upper part of the gas-liquid separation tank 60. The solution 10 from which the gas 11 has been removed in the gas-liquid separation tank 60 is fed through the solution-feeding pump 40 to the solution-feeding destination 50.

The gas increase prevention mechanism is comprised of the aforementioned gas detection sensor 100 disposed in the gas-liquid separation tank 60, the air pump 70 and the gas discharge tube 80. The gas detection sensor 100 is disposed in the upper part of the gas-liquid separation tank 60. When the quantity of gas 11 retained in the upper part of the gas-liquid separation tank 60 exceeds a specified level, the gas detection sensor 100 comes into contact with the gas 11 and is activated. When a signal representing the activation of the gas detection sensor 100 is fed to a control unit of the apparatus, the air pump 70 is activated to discharge the gas 11 retained in the upper part of the gas-liquid separation tank 60 through the gas discharge tube 80 to the outside of the solution channel. Therefore, even if a great quantity of gas 11 enters the solution channel, the gas 11 is discharged outside the solution channel and prevented from entering the solution-feeding pump 40 each time so that the solution feeding accuracy is constantly maintained. The gas increase prevention mechanism may consist of a gas detection sensor and an air pump and be so designed as to discharge a small quantity of gas each time it operates.

There are various ways to control and stop the air pump 70 once it is activated; the solution feeding apparatus may be designed such that the air pump 70 is halted when the gas detection sensor 100 detects that the quantity of gas 11 in the gas-liquid separation tank 60 is sufficiently reduced resulting from the discharge of gas 11 or when a given period of time has passed after the activation of the air pump 70. In case of the latter, i.e., a time-control method, the operating period may be set in accordance with per-hour gas discharge quantity that can be calculated based on the capacity of the air pump 70 used in the apparatus.

After all the solution 10 is drawn up out of the container 20, the negative pressure in the solution channel increases with each operation of the solution-feeding pump 40, and the gas 11 trapped in the gas-liquid separation tank 60 begins to expand accordingly. When, as a result of expansion of the gas 11, the surface of the solution in the gas-liquid separation tank 60 is lowered and reaches the same level as the position of the solution depletion sensor 110, the solution depletion sensor 110 is activated and sends out a signal to the apparatus control unit to stop the operation of the solution-feeding pump 40. By using a design like the above, feeding of the solution 10 can be stopped at the appropriate moment when the solution 10 in the container 20 has completely been consumed while there is no air in the solution-feeding pump 40. The structure may include an alarm that operates in conjunction with termination of the operation of the solution-feeding pump 40 so as to sound a buzzer, light a lamp or otherwise inform the operator that the container 20 has to be replaced with a new one.

As described above, consumption of the solution 10 in the container 20 generates negative pressure in the solution channel, and, as a result, the gas trapped in the upper part of the gas-liquid separation tank 60 expands to the position of the solution depletion sensor 110. During this process, the gas detection sensor 100, too, detects the expansion of the gas 11 and activates the air pump 70. However, as the air pump 70 functions to discharge the gas 11 from the gas-liquid separation tank 60, the operation of the air pump 70 merely enhances the increase of the negative pressure in the gas-liquid separation tank 60 and exerts no undersirable influence on operation of the solution depletion sensor 110. Nevertheless, it is desirable to terminate operation of the air pump quickly by using a time control method as the one describe above, because there is no particular need of keeping the air pump 70 operating before the solution depletion sensor 110 is activated.

The process of replacing a container 20 is explained as follows. First of all, an empty container 20 is removed from the tube 30, and a new container 20 containing a solution 10 is attached in place of the empty container. As the portion between the solution depletion sensor 110 and the tube end portion 31 is in the state where it is filled with gas 11, the air pump 70 is activated to discharge the gas 11 and fill the solution channel with the solution 10. Operation of the air pump 70 causes the solution 10 to be drawn up from the container 20 and fill the solution channel. Therefore, by employing such a design that activation of the gas detection sensor 100 stops the air pump 70, the apparatus can be returned to the initial state where gas 11 is retained in the gas-liquid separation tank 60, only in the portion above the gas detection sensor 100, with the remaining portion of the solution channel filled with the solution 10. The action of the air pump 70 during the container replacement process may be conducted as a resetting action; for example, the apparatus may be designed such that the air pump 70 can be activated by pushing a reset button.

Figure 5:
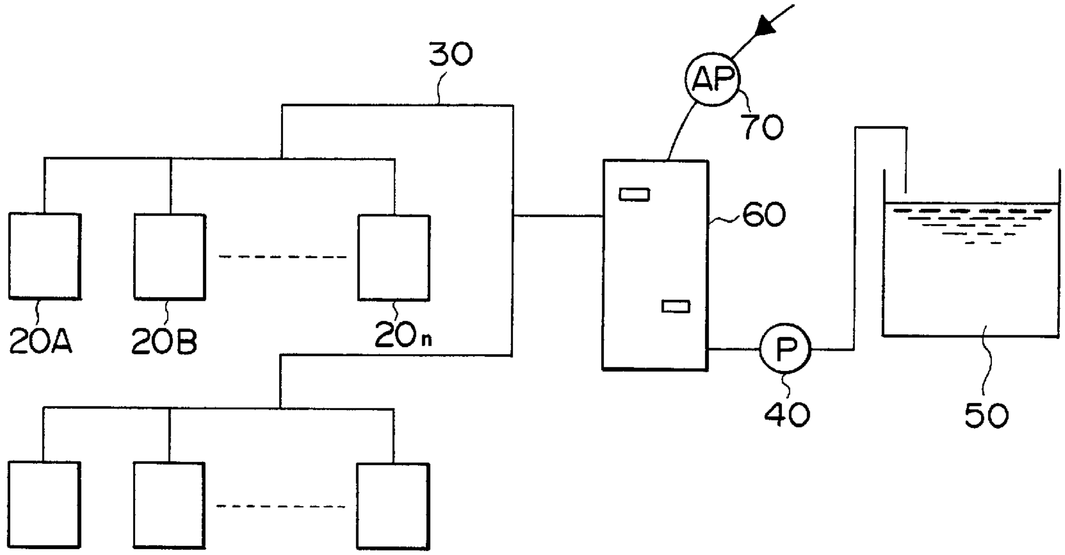
FIG. 5 is a schematic diagram showing the flow of a solution according to another embodiment of the invention.

As shown in FIG. 5, the tube 30 may be branched at some point into a desired number so as to permit use of a plurality of containers 20A, 20B, . . . 20*n* connected to the apparatus. For example, in case the apparatus is used as a replenishing device for processing silver halide photographic materials, it is desirable to use a large-capacity container to contain a processing solution that has to be replenished at a high rate; otherwise, the solution 10 in a container 20 would rapidly be used up so that a container 20 would have to be replaced frequently. However, excessively large containers 20 are difficult to carry and impair operating efficiency. Therefore, in view of the operating efficiency, it is desirable for each container 20 to have a weight of no more than 20 kg so that it can be carried by a single person. When using such middle-sized containers 20 as described above, it is necessary to connect to the apparatus more containers than should large-capacity containers 20 be used. When a large number of containers are connected to the apparatus, a considerable quantity of gas in total will enter the solution channel, unless the quantity of gas that can enter each container is limited to a minimum. According to the invention, however, gas 11 that has entered the solution channel is discharged from the channel at appropriate times. Therefore, no matter how much gas 11 enters the solution channel, there is no possibility of gas 11 entering the solution-feeding pump 40, and precise feeding rate is maintained throughout the operation process of the apparatus.

Figure 6:
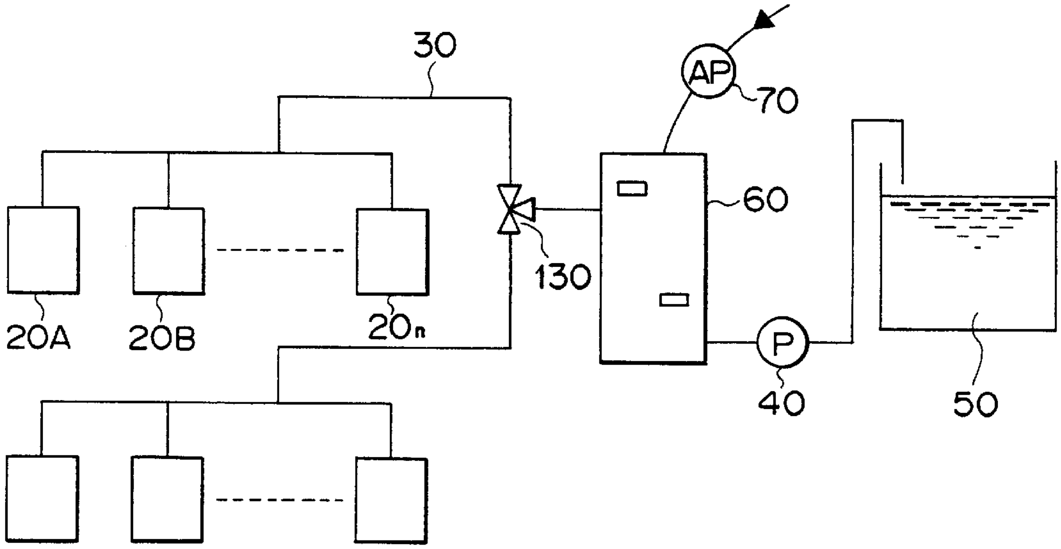
FIG. 6 is a schematic diagram showing the flow of a solution according to yet another embodiment of the invention.

Another example of desirable designs is shown in FIG. 6, wherein containers 20 connected to the apparatus are divided into several groups by means of a changeover valve 130, which is disposed at some point along the length of the tube 30 so that suction of the solution 10 is conducted for one group of containers at a time, instead of drawing the solution 10 up from all the containers 20 at once. In this case, when all the containers 20 of one group become empty, the changeover valve 130 changes the solution channel over to a path that leads to another group so as to continue feeding of the solution 10. Such a structure has a particular benefit in that it is not necessary to replace containers 20 in a hurry when the time scheduled for replacing containers arrives, because there is no possibility of all the containers 20 becoming empty at once. As it is sufficient for the operator to merely replace empty containers whenever he has time, he is allowed to do some other work without having to be concerned about the container replacing schedule. In case such as changeover valve 130 is provided to change over paths of solution, too, it is necessary to carry out resetting operation after all the containers 20 belonging to one group become empty and activate the solution depletion sensor 110 so as to activate the air pump 70 to draw the solution 10 up from the containers 20 that belong to another group and fill the solution channel with the solution. For this purpose, the changeover valve 130 is so designed as to operate in sync with resetting operation. As a result, no matter whether the changeover valve 130 is operated manually or automatically, the air pump 70 is activated to return the apparatus to the initial state where the solution channel is filled with the solution after the paths are changed over by the changeover valve 130.

Figure 10:
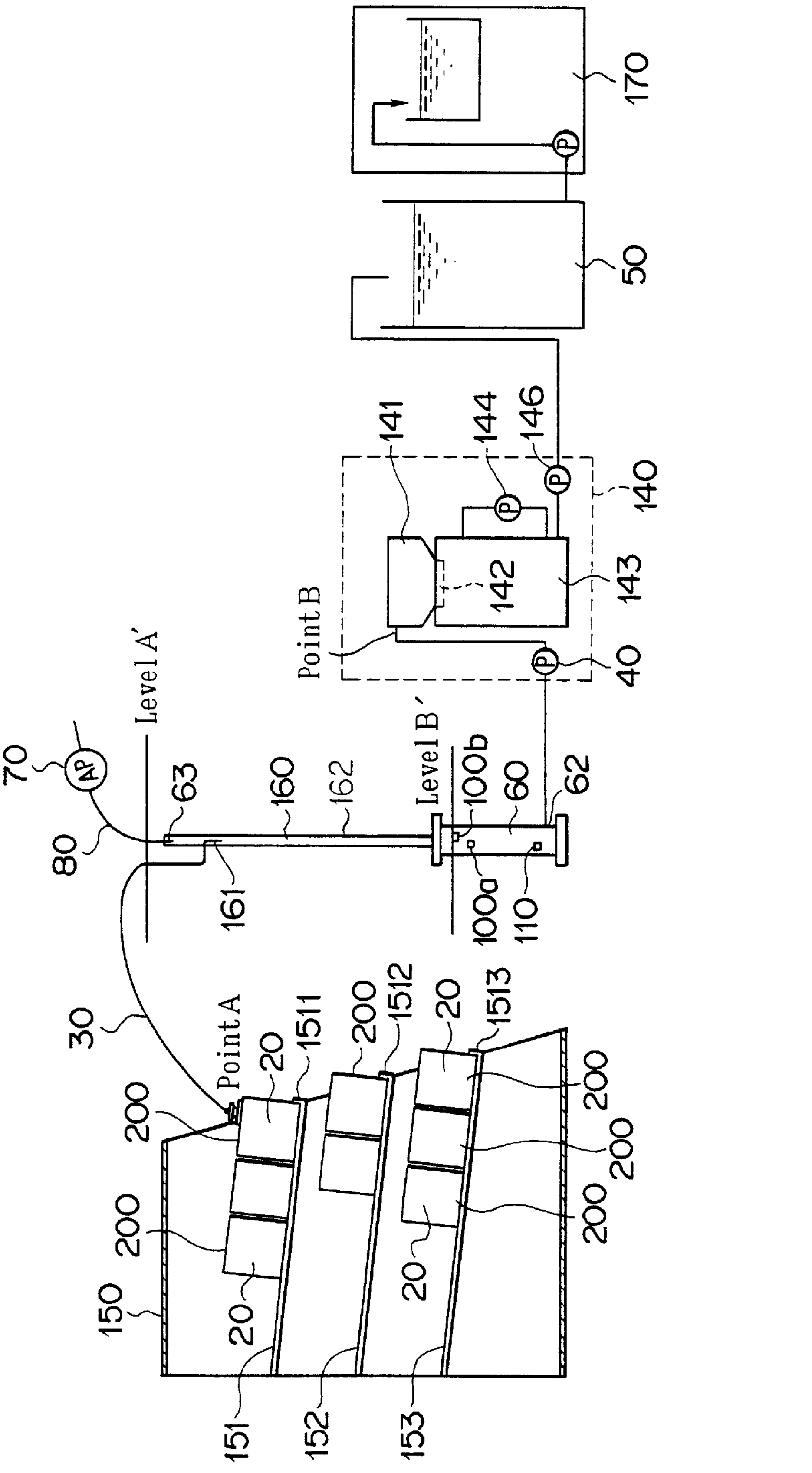
FIG. 10 is a schematic diagram showing the flow of a solution according to yet another embodiment of the invention.

Another embodiment, which is shown in FIG. 10, is explained hereunder.

FIG. 10 shows an example of ways to connect a solution feeding apparatus of the present invention to an automatic developing apparatus for processing photogenic materials.

A storage space for containers can be made compact by storing containers in a three-dimensional manner by using a rack or other storage means 150 that can house numerous containers 20, 20 . . . Each container 20 may conveniently be contained in an outer casing 200, which has a retainable shape, such as a cardboard box.

In case of the present embodiment, the storage means 150 has a multi-level structure, of which the levels are respectively allocated for different processing solutions so that appropriate numbers of containers 20 containing a single, same kind of processing solution are placed on each level in the state where each container 20 is housed in outer casing 200.

The levels 151, 152, . . . , of the storage means 150 are gently inclined downward from the rear end toward the front end, and each level 151, 152, . . . is provided at its front end with a stopper portion 1511, 1512, . . . so that several outer casings 20 that house containers 20, 20 . . . can be placed on each level 151, 12, . . . Each level is formed of the shelf or a frame that is capable of holding outer casings 200 therein. When the solution contained in the container 20 that is housed in the outer casing 200 located at the front end of any one of the levels has been used up, it is sufficient to pick up the outer casing 200 together with the container in the casing so as to let the outer casing 200 immediately behind it slide downward by the weight of the container 20 housed in the outer casing and stopped by the stopper portion 1511, 1512, . . . at the front end. Thus, solution can be fed from the new container 20.

Furthermore, should all the containers located at the front end of the level become empty, they, too, can be replaced quickly. The above structure thus permit a plurality of containers to be replaced quickly and efficiently.

Figure 17:
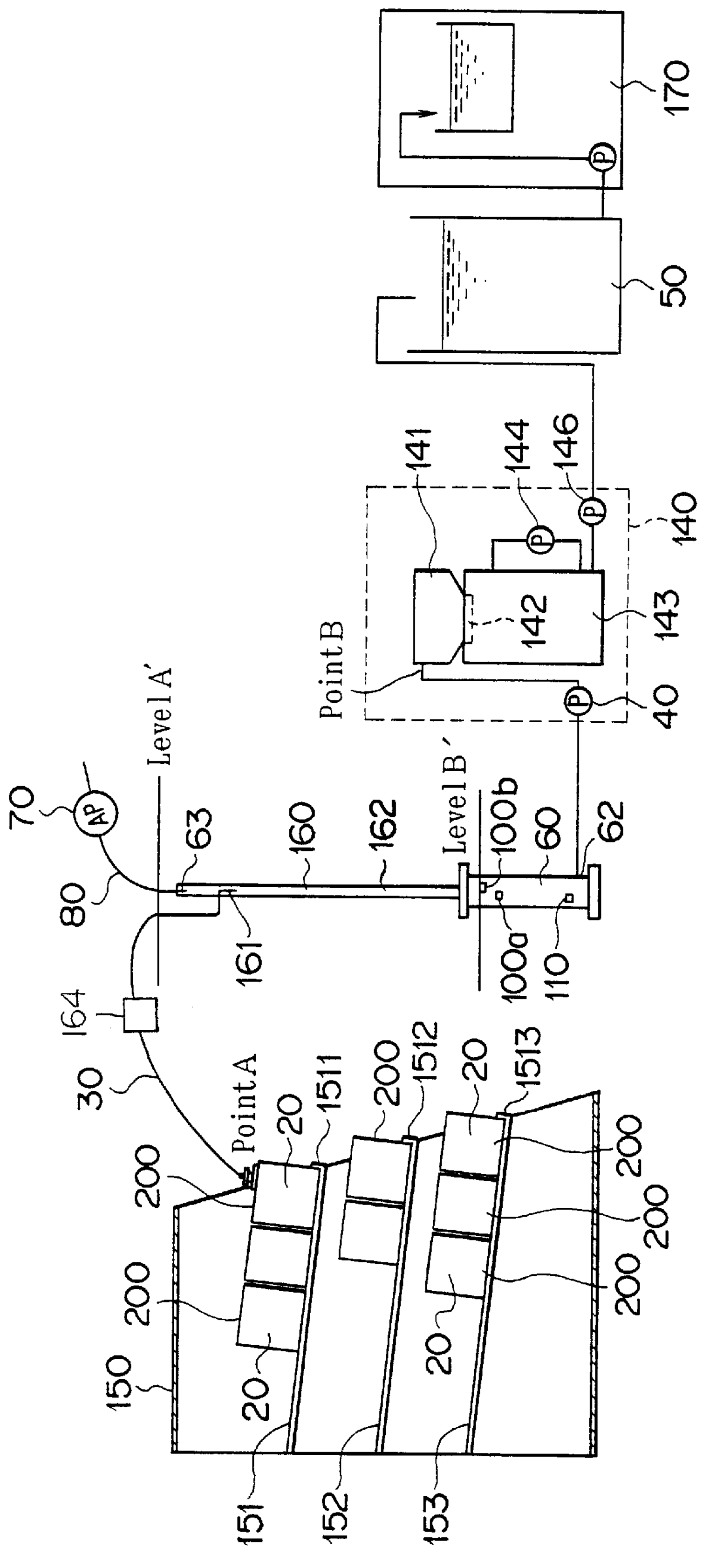
FIG. 17 is a schematic diagram showing the flow of a solution according to an embodiment of the invention.
Figure 18:
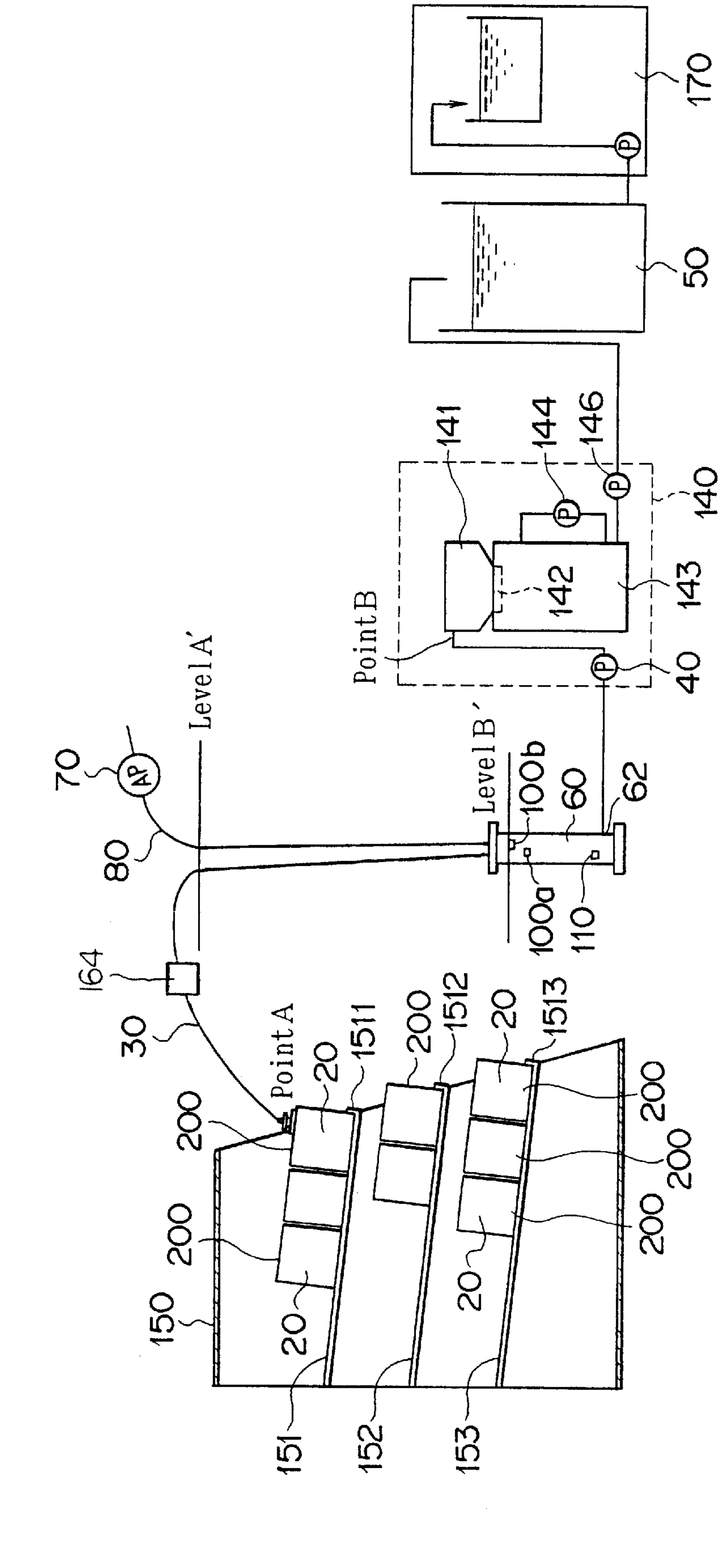
FIG. 18 is a schematic diagram showing the flow of a solution according to an embodiment of the invention.

In case a point A where a container 20 is connected to the tube 30 is higher than the level A', i.e. the height of corresponding to the point where the tube 30 is connected to the gas-liquid separation tank 60, it is necessary to prevent solution from flowing out of the container 20 into the gas-liquid separation tank 60 due to siphonage. Accordingly, the tube 30 may be provided with a solution feeding stopping device 162 and is disposed somewhere between the container 20 and the gas-liquid separation tank 60 so that the solenoid valve may be opened or closed in sync with halting of the solution-feeding pump 40. The solution feeding stopping device 162 may be, for example, a solenoid 164 as shown in FIGS. 17 and 18.

Figure 11:
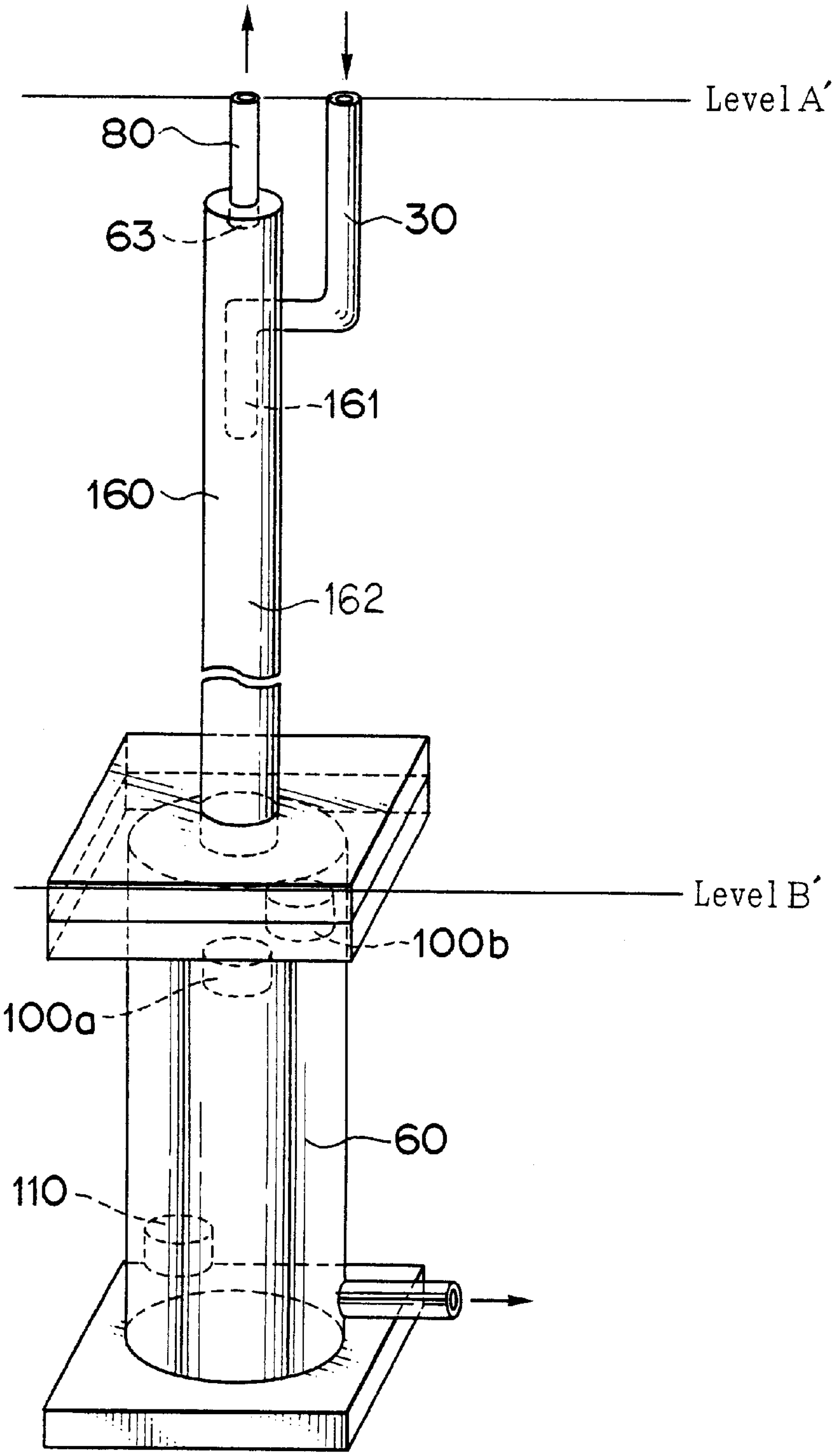
FIG. 11 is an enlarged schematic illustration of a principal part of said embodiment.
Figure 12:
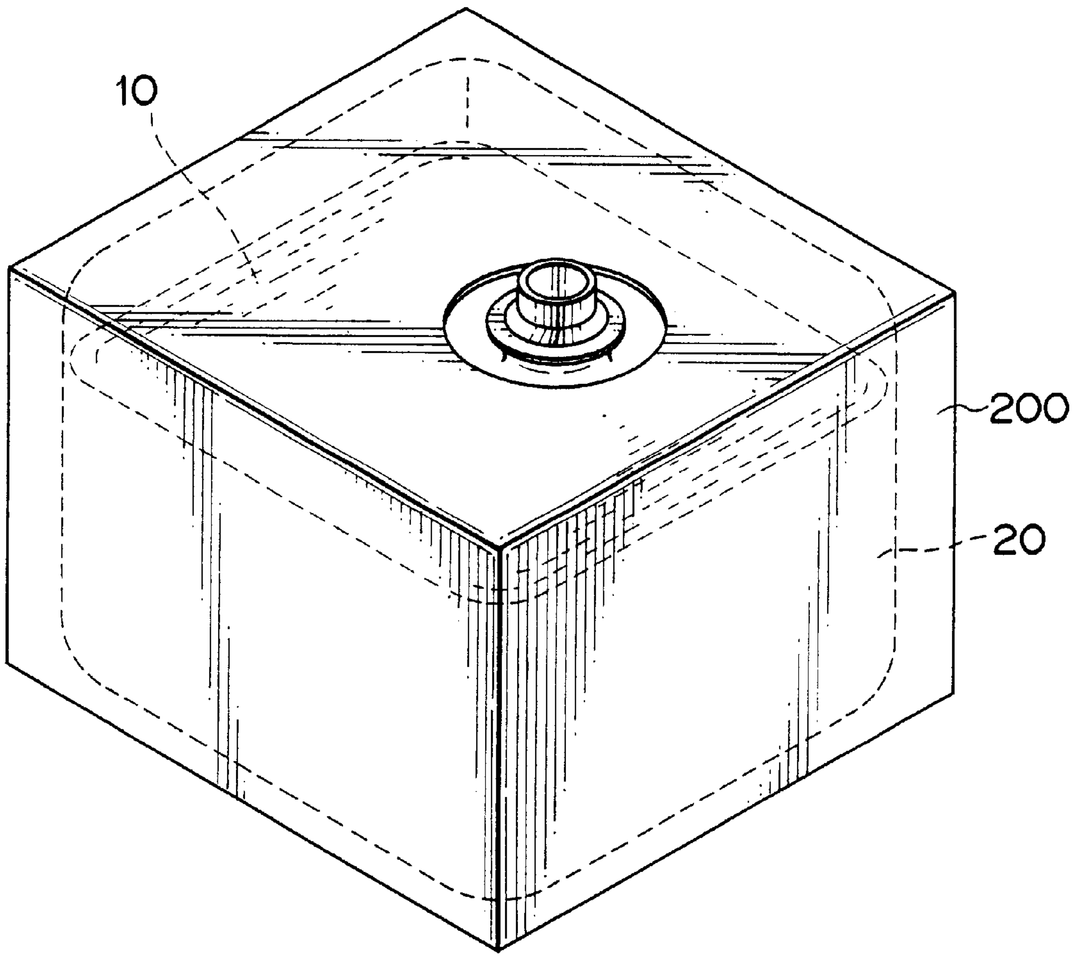
FIG. 12 is a schematic illustration of another embodiment of a container and an outer casing used for the present invention.
Figure 13:
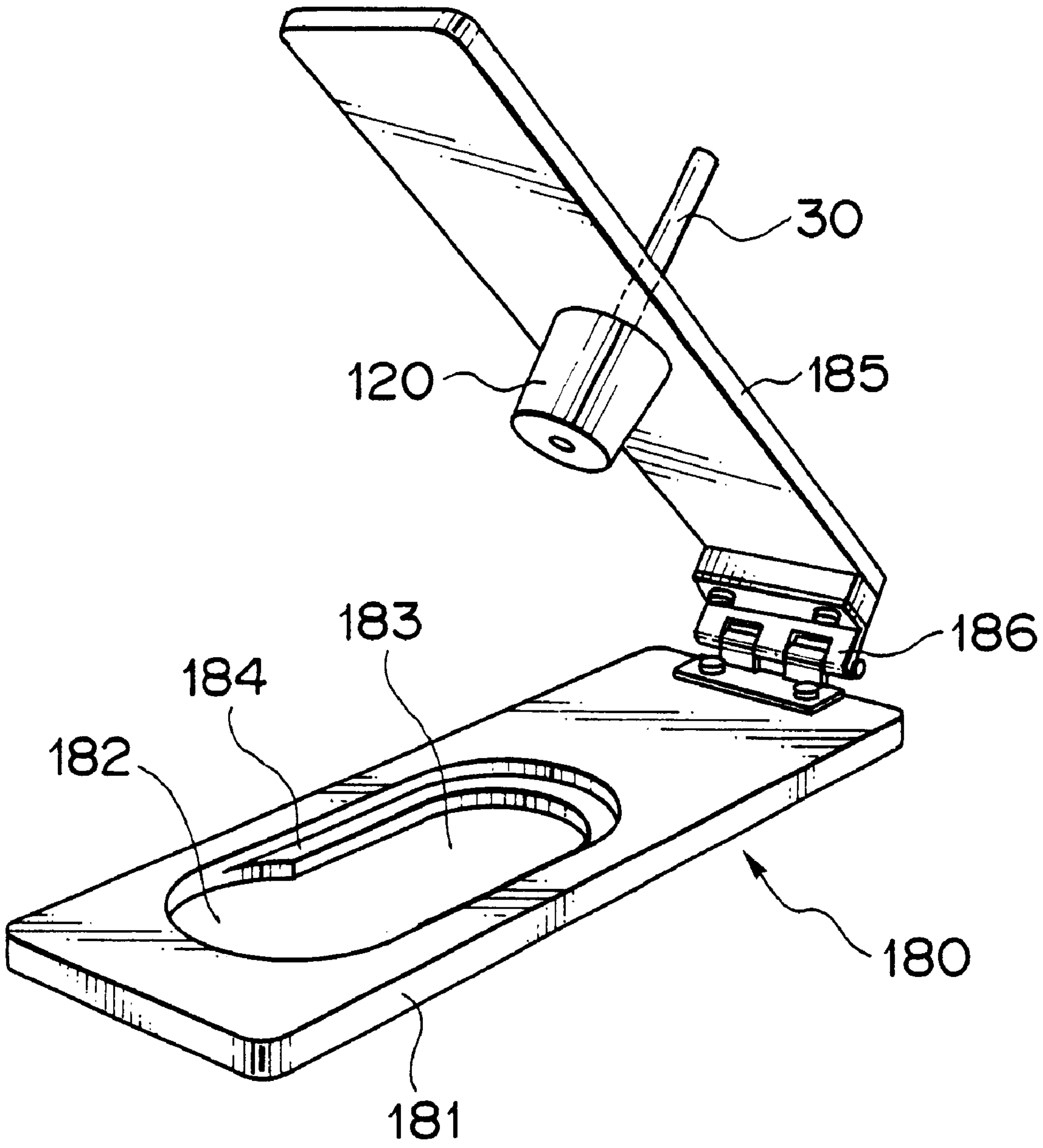
FIG. 13 is a perspective of an embodiment of a connecting means for connecting a tube to a container.
Figure 14:
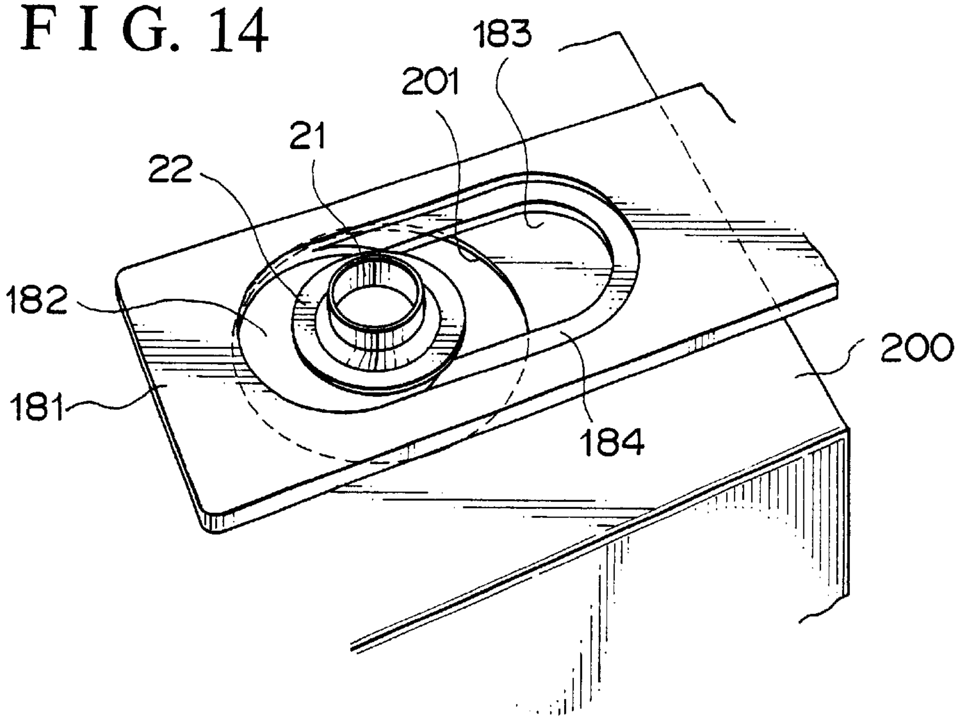
FIG. 14 is a schematic illustration of said connecting means.
Figure 15:
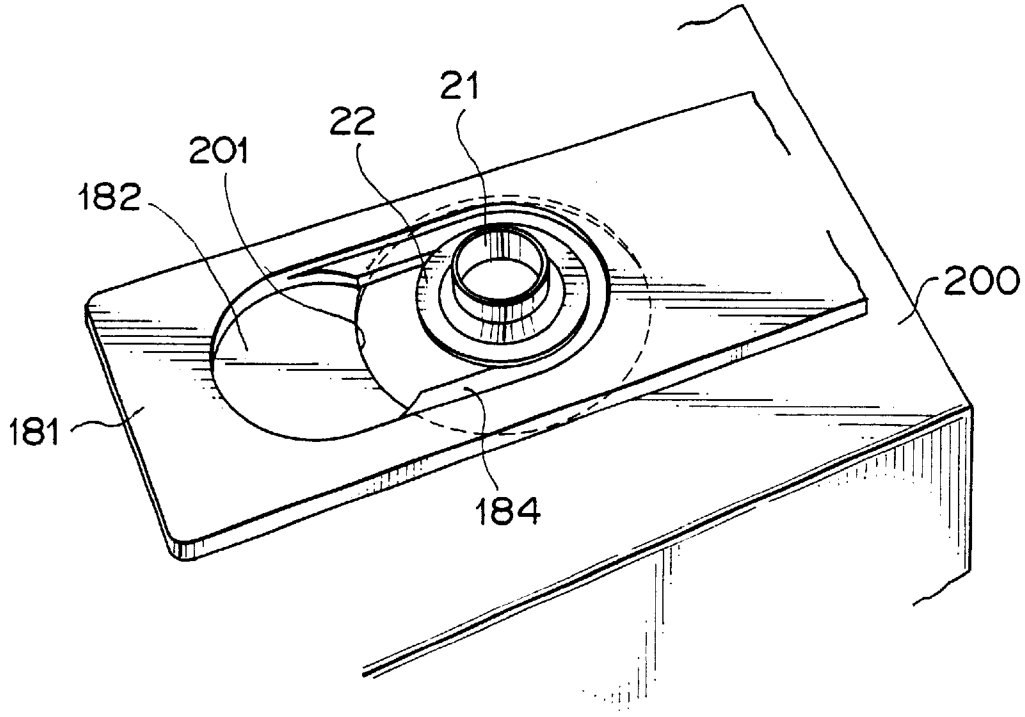
FIG. 15 is a schematic illustration of said connecting means.
Figure 16:
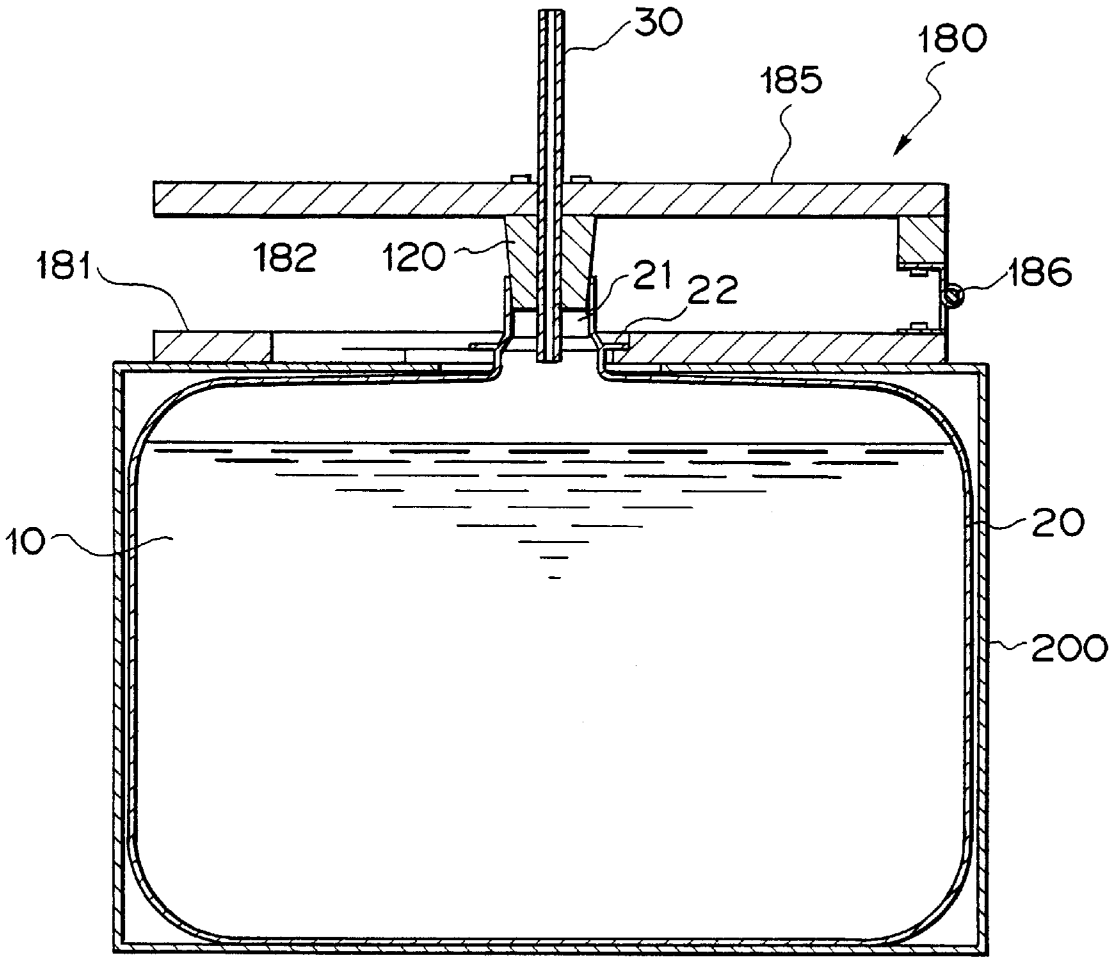
FIG. 16 is a side view of said connecting means, a part of which is shown in a vertical section.

Referring now to FIGS. 10 and 11, according to another embodiment of the invention, the apparatus includes a connecting pipe 160, which serves as a solution feeding stopping device 162. The connecting pipe 160 extends from the top of the gas-liquid separation tank 60 and is connected to the tube 30 as shown at 161 so that the level A', i.e. the height corresponding to the point where the tube 30 is connected to the gas-liquid separation tank 60, is higher than the point A where a container 20 is connected to the tube 30.

Although the tube 30 is connected to the side face of the connecting pipe 160 as shown at 161, in case of the present embodiment, the connecting pipe 160 may have a larger diameter so that the tube 30 can be connected to the upper end of the connecting tube 160 as is the case with the tube 80 to which the air pump 70 is connected. In any case, outlet 63 of the connecting pipes 160 by a distance of not less than 100 mm. By employing such a structure as described above, the air pump 70 is prevented from inadvertently taking in solution 10 even if the solution 10 flows into the pipe when the air pump 70 is activated.

Referring to FIG. 10, three sensors are disposed in the gas-liquid separation tank 60, because two sensors respectively serve as gas detection sensors. In this case, the aforementioned air pump 70 starts to operate in sync with a gas detection sensor 100*a* and stops in sync with a gas detection sensor 100*b*, which is diposed at a location higher than the gas detection sensor 100*a*. Thus providing two gas detection sensors not only enables the more meticulous, accurate control of discharge of gas that has centered the gas-liquid separation tank 60 but also has benefits in respect to the life of sensors, because it is capable of preventing chattering which is prone to occur in case only a single sensor is provided.

According to the structure of the embodiment shown in FIG. 10, the portion extending further than a gas-liquid separation tank 60 passes through a solution-feeding pump 40 in a solution preparation device 140 and is connected to a measuring tank 141 of the solution preparation device 140. In case of the embodiment, the portion extending from the point A where a container 20 is connected to a tube 30 to the point B where the tube 30 is connected to the measuring tank 141 serves as an airtight channel. Tubes 30 adapted to respectively carry solution parts and diluent water are connected to the measuring tank 141, and solution parts are successively fed into the measuring tank 141, each solution being fed one part at a time.

Providing a measuring tank 141 having a structure described above enables the more accurate measurement of quantities of solution parts and, consequently, the precise preparation of processing solutions. At the point when the quantity of a solution part fed into the measuring tank 141 precisely reaches a given value, delivery of the solution to the measuring tank 141 stops, and an open-close valve 142 is opened to let the solution part in the measuring tank 141 fall into a mixing tank 143. After the interior of the measuring tank 141 is washed with diluent water, the open-close valve 142 is closed, and another solution part is fed into the measuring tank 141.

After the solution part is precisely measured in the same manner as above, the open-close valve 142 is opened to feed the solution part into the mixing tank 143. After the interior of the measuring tank 141 is washed again, diluent water is fed to a given location in the mixing tank 143 where a sensor is installed so that the total volume of the liquid in the mixing tank 143 reaches a given amount. The solutions in the mixing tank 143 are mixed together by means of a mixing pump 144 and thus made into a precisely prepared replenishment solution for a solution for processing photographic materials. In order to recycle overflow liquid discharged from an automatic developing apparatus or waste water resulting from a water washing process, a configuration which calls for using overflow liquid or other waste liquid in place of diluent water mentioned above is also possible.

Thus prepared replenishment solution is delivered by a pump 146 into a stock tank 50, which serves as the solution-feeding destination, and then fed to an automatic developing apparatus 170.

In case a solution feeding apparatus according to the invention is used in a state where is it connected to a solution preparation device 140 having a structure described above, the solution feeding apparatus is positioned as shown in FIG. 10 so that the point B where the tube 30 is connected to the measuring tank 141 is located higher than the level B', i.e. the liquid level at which the surface of the liquid in the gas-liquid separation tank 60 is maintained during the solution feeding process. With the structure as above, the solution is prevented from continuously flowing into the measuring tank 141 by siphonage. The level B' referred to herein corresponds to the location where the gas detection sensor 100*b* is installed in the gas-liquid separation tank 60.

Next, each element and component of the invention is explained in detail.

Figure 7:
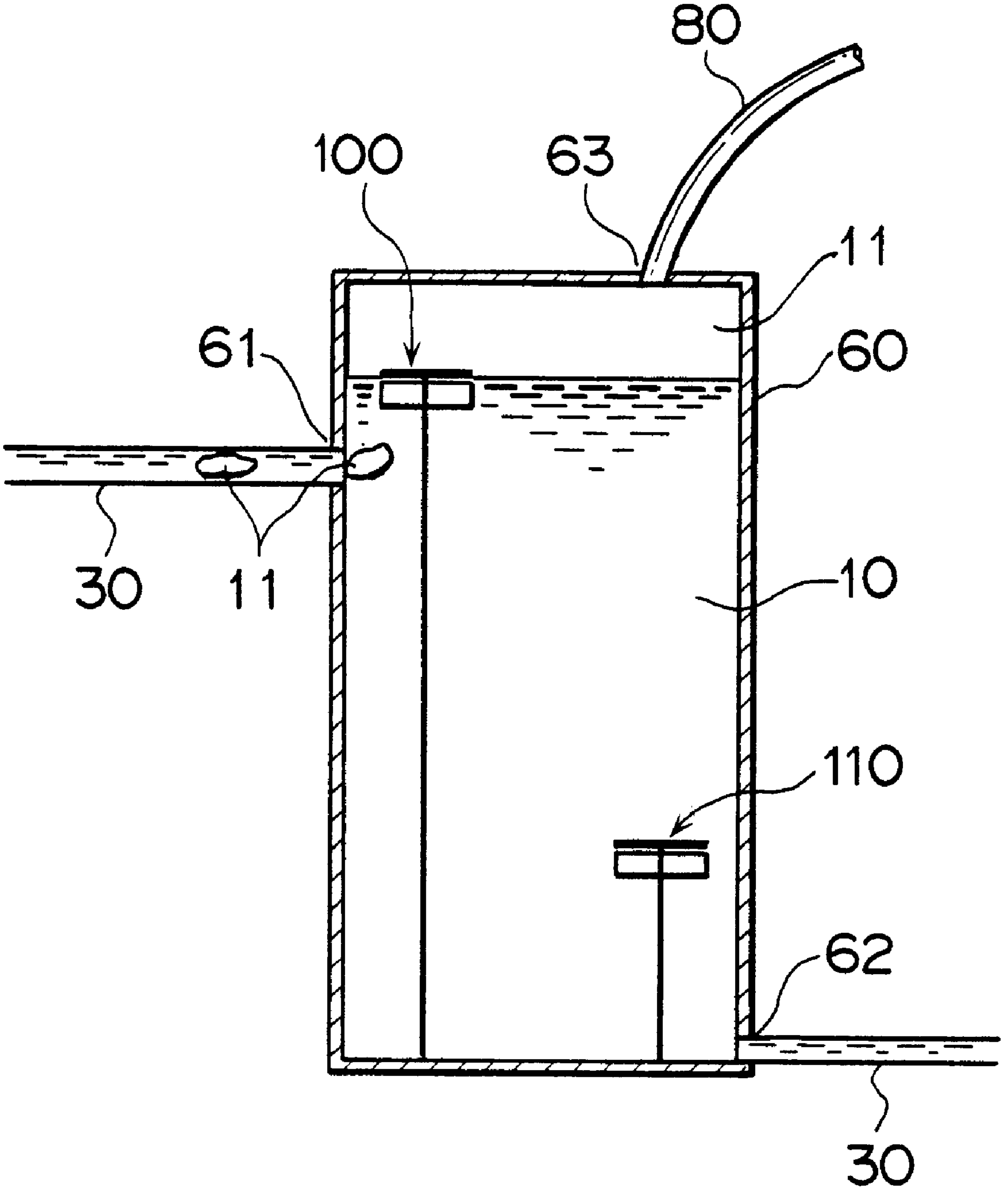
FIG. 7 is a side view of an embodiment of a gas-liquid separation tank used in the present invention, a part of which is shown in a vertical section.

The gas-liquid separation tank 60 is disposed in an airtight channel, which is a part of the solution channel and extends between a container 20 and the solution-feeding pump 40. FIG. 7 is a side view of the gas-liquid separation tank 60, a part of which is shown in a vertical section. The gas-liquid separation tank 60 is provided with a solution inlet 61, which is connected to the container 20 via a tube 30, and a solution outlet 62, which is connected to the solution-feeding pump 40 via a tube 30 in the same manner as the solution inlet 61. The gas-liquid separation tank 60 is also provided, at the upper part thereof, with a gas outlet 63, to which an air pump 70 is connected via a gas discharge tube 80. A gas detection sensor 100 for maintaining a constant quantity of gas 11 in the gas-liquid separation tank 60 is disposed in the gas-liquid separation tank 60. It is desirable to also install a solution depletion sensor 110 in the gas-liquid separation tank 60 so as to ensure more reliable prevention of undesirable entry of gas 11 into the solution-feeding pump 40.

The gas-liquid separation tank 60 may have a cylindrical or prismatic shape or any other desirable shape. The material of the gas-liquid separation tank 60, however, is required to have the ability of enduring the negative pressure generated when the pressure in the solution channel is reduced by the solution-feeding pump 40 so as to expand the gas 11 in the gas-liquid separation tank 60 to such an extent that the sensor detects that the container 20 has become empty. Examples of desirable materials include vinyl chloride, polycarbonate, stainless steel (SUS) and titanium. Polycarbonate is particularly desirable because of its strength. Particularly, when a large-capacity container 20 is connected, it is necessary to use a solution-feeding pump 40 having a great capacity in order to draw the solution 10 completely out of the container 20, because a large-capacity container 20 is usually made of a thick film to give the container an increased strength. In order to draw the entire solution 10 up out of such a container 20 so that no solution 10 remains in the container 20, it is necessary to design the apparatus such that the solution depletion sensor 110 is activated when the pressure in the gas-liquid separation tank 60 is reduced to within the range of 0.05 to 0.85 atm. It is desirable for the gas-liquid separation tank 60 to have the ability of withstanding a pressure of not less than 10 $kgf/cm^2$.

In case the inner diameter of the gas-liquid separation tank 60 is less than 8 mm, the surface tension of the solution in the gas-liquid separation tank 60 is greater than the buoyancy of gas 11, causing the gas 11 to become attached to the gas-liquid separation tank 60 and unable to be separated from the solution 10. Therefore, as the solution 10 flows into the solution-feeding pump 40, the gas 11, too enters the solution-feeding pump 40. In order to prevent such an occurrence, it is desirable for the gas-liquid separation tank 60, to have an inner diameter of more the 8 mm. When such a factor alone is taken into consideration, the greater the inner diameter of the gas-liquid separation tank 60, the better. On the other hand, a greater inner diameter of the gas-liquid separation tank 60 presents the possibility of greater error in operation of the gas detection sensor 100 or the solution depletion sensor 100. Therefore, it is particularly desirable for the inner diameter of the gas-liquid separation tank 60 to be in the range of 13 mm to 200 mm.

Although there is no particular limitation in the maximum height of the gas-liquid separation tank 60, it is desirable for the gas-liquid separation tank 60 to have such a height as to allow a sufficient difference of elevation of the gas detection sensor 100 and the solution outlet 62. Taking into consideration such factors as being easy to install sensors and capability of making the whole apparatus compact, tanks having heights in the range of 50 mm to 500 mm are usually most desirable. As for the connecting pipe 160, which is attached to the gas-liquid separation tank 60 when it is necessary, a tube having a length ranging from 50 mm to 2000 mm is normally most desirable.

A desirable positional relationship among the solution inlet 61, the solution outlet 62 and the solution depletion sensor 110 of the gas-liquid separation and 60 is shown in FIG. 7, wherein the solution inlet 61, from which the solution 10 flows into the gas-liquid separation tank 60 during the solution feeding process, is positioned higher than the solution outlet 62, from which the solution 10 flows out of the gas-liquid separation tank 60, and the solution depletion sensor 110 is disposed in the gas-liquid separation tank 60, at a location higher than the solution outlet 62. This configuration ensures more reliable prevention of undesirable entering of gas 11 into the solution-feeding pump 40.

The gas detection sensor 100 is disposed in the gas liquid separation tank 60 and the location of the gas detection sensor 100 determines how much gas 11 can constantly be retained the gas-liquid separation tank 60. As gas of a too little quantity is prone to causing malfunction of the gas detection sensor 100, the gas-liquid separation tank 60 should desirable have a gas retaining capacity of more than 5% of the volume of the gas-liquid separation tank 60. Normally it is appropriate to design the gas-liquid separating tank 60 so as to retain gas 11 having a quantity of approximately 10% of the total capacity of the gas-liquid separation tank 60.

The solution depletion sensor 110 is disposed in the airtight channel, which is a part of the solution channel and extends between the gas detection sensor 100 and the solution-feeding pump 40. In order to more reliably preventing gas 11 from entering the solution-feeding pump 40, it is desirable to dispose the solution depleting sensor 110 in the gas-liquid separation tank 60 together with the gas detection sensor 100. The gas detection sensor 100 and the solution depletion sensor 110 are positioned apart from each other with a sufficient distance therebetween to prevent erroneous detection or malfunction of either sensor. In normal cases, it suffices that there is at least a distance of approximately 10 mm between the gas detection sensor 100 and the solution depletion sensor 110.

Figure 8:
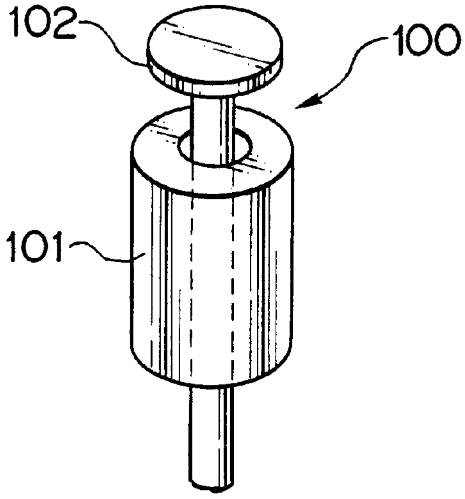
FIG. 8 is a perspective of an embodiment of a gas detection sensor, which constitutes a part of the embodiment.
Figure 9:
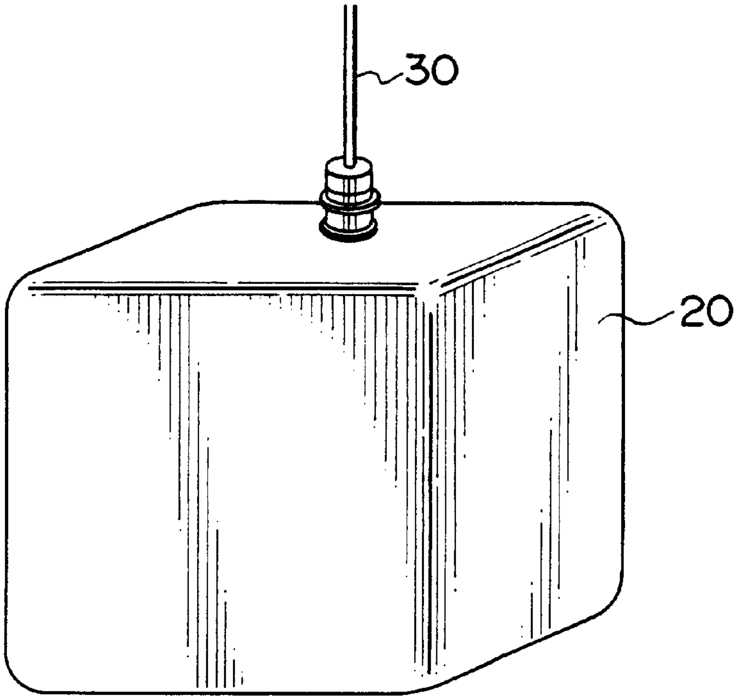
FIG. 9 is a perspective of an embodiment of a container used for the invention.

Any type of sensor may serve as the gas detection sensor 100 or the solution depletion sensor 110, provided that it is capable of detecting gas 11. Examples of such sensors include float sensors, electrode sensors and photoelectric sensors. A sensor, which is capable of detecting decrease in the pressure in the gas-liquid separation tank 60, too, may serve as the solution depletion sensor 110. Therefore, pressure sensors are also applicable. FIG. 8 shows an exemplary float sensor, which may be used as the gas detection sensor 100 or the solution depletion sensor 110. In case of the example shown in FIG. 8, the gas detection sensor 100 consists of a float 101 and a sensor unit 102. When the portion of a solution channel in which a float sensor of this type is disposed is filled with a solution 10, the float 101 and the sensor unit 102 of the float sensor are in contact with each other because of buoyancy of the float 101. When the float 101 becomes separated from the sensor unit 102 as a result of gas 11 reaching the gas detection sensor 100, a signal representing separation of the float is sent to the control unit so as to conduct necessary operation such as operating the air pump 70, stopping the solution-feeding pump 40 and activating the alarm.

The air pump 70 is of a discharge type and desirable has a sufficient output capacity to quickly discharge excessive gas 11 out of the solution channel. Normally, a pump having an output capacity in the range of 0.4 to 15 L/min is used.

The gas discharge tube 80 connected to the air pump 70 is provided with a check valve 90 so as to prevent air from flowing backward through the gas discharge tube 80 into the gas-liquid separation tank 60. In order to withstand negative pressure in the gas-liquid separation tank 60, it is desirable for the check valve 90 to have a pressure withstanding ability of not less than 30 kg/cm$^2$. The gas discharge tube 80 may be provided with a plurality of check valve 90 so as to increase the pressure withstanding ability. The check valve 90 or the check valves 90 may be disposed at any location in the gas discharge tube 80; the function of the check valve 90 (or the set of check valves 90) is unaffected regardless of whether it is located upstream or downstream from the air pump.

The container 20 used for the present invention is a flexible container, which is capable of changing its shape in accordance with the amount of its contents so that the solution 10 can completely be drawn up out of the container. Flexible containers may have various shapes, including those resembling a water pillow, a cube or a bag in a box. There are no particular limitations in the capacity of a container that can be used for the invention. In order to reduce the frequency of replacing containers, however, it is desirable to use containers having the largest possible capacity. In case of an apparatus according to the invention is used as a replensihing apparatus to replenish a processing solution for processing a silver halide photographic material, the frequency of replacing containers 20 can be reduced to such an extent that no significant burden is imposed upon the operator by using containers 20 having a capacity ranging from approximately 3 to 60 L. The range of an appropriate capacity, however, depends on the rate of replenishing the solution.

There are no particular limitations in choosing the material for containers 20, and examples of appropriate materials include polyolefine-based resin, such as polyethylene and LLDPE (linear low-density polyethylene), ethylene-vinyl alcohol copolymer resin, such as EVAL, polyethylene terephthalate, nylon, cellulose acetate, polyvinyl acetate, ionomer vinylidene chloride, polystyrene, ceramics and aluminum.

It is desirable for each container 20 used for the invention to have a superior impermeability to gas and has a sufficient strength to endure long-term storage or vibration during transportation. Containers having a film thickness ranging from 50 $\mu$m (micro meter) to 300 $\mu$m and an oxygen permeability of no more than 100 ml/m$^2$ per day environment of 1 atm, 20° C. and 60% RH satisfy the above requirement and, therefore, desirable.

The tube 30 and the gas discharge tube 80 may desirably be resistant to chemicals and formed of such a material as vinyl chloride, polyethylene, silicone, Teflon, metal or the like. A tube made of soft polyvinyl chloride (PVC) is particularly preferable because of its superior impermeability to gas and an appropriate hardness to facilitate operation of tube arranging.

The inner diameter of the tube 30 may desirably be limited to less than 8 mm. By limiting the inner diameter to less than 8 mm, a human body or equipment in the surrounding can be protected from contamination by solution 10, which may otherwise occur by the solution 10 accidentally spilling from the tube 30 when replacing a container 20. However, a tube having an exceedingly small inner diameter is not desirable, because it imposes a heavier load onto the solution-feeding pump 40. Therefore, a tube having an inner diameter in the range of 3 mm to 6 mm is particular desirable.

Supply of a solution is conducted by operating the solution-feeding pump 40 as needed so that the solution 10 may be fed only when it is necessary. Therefore, the amount of the solution 10 to be supplied can be controlled by means of, for example, limiting the duration of each operation of the solution-feeding pump 40. In cases where it is desirable to feed the solution 10 in a small quantity each time, fluctuation in quantity of the solution can be reduced by using a solution-feeding pump 40 having a small capacity. Accordingly, in cases where a relatively large quantity of the solution is fed each time, a desired quantity of solution can be fed within a short period of time by using a pump that has a relatively large capacity. Of course, it is possible to feed solution continuously instead of feeding it intermittently. In case of continuous feeding, too, the solution-feeding rate can be determined as desired by choosing a solution-feeding pump 40 that has an appropriate capacity.

In case of a solution which is usually sold in the form of a concentrated liquid and diluted at a specified ration when used, such as a processing solution for processing a silver halide photographic material, a diluent water tank for reserving the diluent water and a diluent water feeding pump for feeding the diluent water may be provided so that the diluent water can be fed to the solution-feeding destination 50 simultaneously with the solution 10 by operating the diluent water feeding pump in sync with the solution-feeding pump 40 that serves to feed the solution 10. By controlling respective strokes of the pumps, the solution 10 can be diluted to a desired concentration without human involvement. In cases where the solution is a product that consists of a plurality of solution parts and has to be prepared by mixing the solution parts at specified mixing ratios and diluting the mixture with water, a plurality of airtight channels in a number of solution parts may be provided so that the solution parts can respectively be fed with appropriate mixing ratios by controlling operation of their respective pumps 40.

As described above, when feeding a solution which requires dilution or mixing solution parts, the solution parts may be fed directly to the solution-feeding destination 50 and mixed together therein, or the apparatus may include an intermediate tank or a separate tank where the exits of all the airtight channels and the exit of the channel for feeding the diluent water are brought together so that the solution parts are mixed together and diluted in the intermediate tank or the separate tank into a solution that is ready for use and then fed to the solution-feeding destination.

A bellows pump, a magnet pump or the like is used as the solution-feeding pump 40. In case a magnet pump is used, it is necessary to provide at less one check valve either upstream or downstream from the solution-feeding pump 40 in order to prevent back-flow of the solution. For this reason, a bellows pump, which does not necessitate a check valve, is particularly desirable. As a container having a capacity of more than 5 liters is made of a thick polymer film so as to ensure a sufficient strength, the solution-feeding pump used may desirable have a large output capacity so as to be capable of suctioning the solution from the container until the container is completely empty. For this reason, a bellows pump having an output capacity in the range of 200 ml to 2700 ml/min is particularly desirable.

It is not always necessary to incorporate the solution-feeding pump 40 in the device in which the gas-liquid separation tank 60 and the tube 30 connected to the container 20 are installed; for the example, in case the apparatus for processing photographic materials may be used by connecting the gas-liquid separation tank 60 of an apparatus according to the invention is used as a replenishing apparatus to replenish a processing solution for processing a silver halide photographic material, a replenishing pump of an automatic developing apparatus according to the invention to the aforementioned replenishing pump. It is also permissible to connect the gas-liquid separation tank 60 of an apparatus according to the invention to a solution-feeding pump of a separate type apparatus, such as an automatic solution preparation apparatus which is available on the market as an optimal device for an automatic developing apparatus. If such is the case, the separate device functions as a part of the solution feeding apparatus of the invention.

What is claimed is:

1. A solution feeding method comprising:

connecting a solution-feeding pump via a tube to a container which hermetically contains a solution and is capable of changing its shape in accordance with the amount of its content, separating gas from the solution by a gas-liquid separation tank that is a part of an airtight channel extending from the container to the pump, and discharging the gas out of the solution channel by a gas increase prevention mechanism that forcibly discharges gas without causing any outside air to enter the airtight channel so that the gas in the gas-liquid separation tank is maintained at a generally constant quantity.

2. A solution feeding method for feeding a solution, as claimed in claim 1, further comprising, connecting the solution-feeding pump to the tube by a base plate and a top plate which are rotatably attached.

3. The solution feeding method for feeding a solution, as claimed in claim 1, wherein the step of connecting a solution-feeding pump via a tube to a container includes the following steps:

providing a base plate and a top plate which are hingedly attached to each other to allow the base plate and top plate to be opened or closed relative to one another;

providing a through hole in the base plate;

inserting a spout portion of a container through the base plate through the through hole in the base plate;

providing a plug affixed to the top plate and having an aperture through the plug;

inserting the tube into one end of the plug aperture; and closing the top plate over the base plate to insert the tube into the spout of the container.

4. A solution feeding apparatus comprised of:

a container that hermetically contains a solution, said container is capable of changing its shape in accordance with the amount of its content;

a solution-feeding pump, said pump is connected via a tube to the container;

an airtight solution channel between the container and the solution-feeding pump; and a gas increase prevention mechanism provided in the solution channel;

wherein said gas increase prevention mechanism forcibly discharges gas without causing any outside air to enter the airtight channel.

5. A solution feeding apparatus as claimed in claim 4, further comprising:

a gas-liquid separation tank adapted to separate gas from the solution;

wherein the gas increase prevention mechanism comprises a gas detection sensor disposed in the gas-liquid separation tank and an air pump which cooperates with the gas detection sensor to discharge gas out of the gas-liquid separation tank.

6. A solution feeding apparatus as claimed in claim 5, wherein the airtight channel between the container and the solution-feeding pump comprises a solution depletion sensor adapted to detect that the container has become empty of solution.

7. A solution feeding apparatus as claimed in claim 6, wherein the solution depletion sensor is disposed in said gas-liquid separation tank.

8. A solution feeding apparatus as claimed in claim 7, wherein the gas detection sensor disposed in the gas-liquid separation tank is located higher than the solution depletion sensor.

9. A solution feeding apparatus as claimed in claim 6, wherein the gas increase prevention mechanism further comprises: a gas discharge tube connected to the air pump, the gas discharge tube is provided with a check valve.

10. A solution feeding apparatus as claimed in claim 6, wherein the solution-feeding pump is controlled based on detection of reduction of the pressure in the solution channel by the solution depletion sensor.

11. A solution feeding apparatus as claimed in claim 6, further comprising a tube which can be connected to a plurality of containers.

12. A solution feeding apparatus as claimed in claim 5, further comprising a solution feeding stopping device disposed between the container and the gas-liquid separation tank.

13. A solution feeding apparatus comprising:

a container that hermetically contains a solution, said container is capable of changing its shape in accordance with the amount of its content;

a solution-feeding pump, said pump is connected via a tube to the container;

an airtight solution channel between the container and the solution-feeding pump;

a gas increase prevention mechanism provided in the solution channel;

a gas-liquid separation tank adapted to separate gas from the solution;

wherein the gas increase prevention mechanism comprises a gas detection sensor disposed in the gas-liquid separation tank and an air pump which cooperates with the gas detection sensor to discharge gas out of the gas-liquid separation tank.

* * * * *